US010179434B2

(12) United States Patent
Osborne et al.

(10) Patent No.: US 10,179,434 B2
(45) Date of Patent: Jan. 15, 2019

(54) MOLDING ASSEMBLY AND MOLDING PROCESS

(71) Applicant: TYCO ELECTRONICS CORPORATION, Berwyn, PA (US)

(72) Inventors: Jason Anthony Osborne, Stoneville, NC (US); Fernando Luis Sierra, Winston-Salem, NC (US); Jason Thomas Chiota, Harrisburg, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 38 days.

(21) Appl. No.: 15/279,784

(22) Filed: Sep. 29, 2016

(65) Prior Publication Data

US 2018/0085983 A1    Mar. 29, 2018

(51) Int. Cl.
*B29C 45/37*    (2006.01)
*B29C 33/30*    (2006.01)
*B29C 49/48*    (2006.01)
*B29C 49/30*    (2006.01)
*B29C 45/26*    (2006.01)
*B29C 45/27*    (2006.01)

(52) U.S. Cl.
CPC .......... *B29C 45/376* (2013.01); *B29C 33/306* (2013.01); *B29C 33/308* (2013.01); *B29C 45/2675* (2013.01); *B29C 49/30* (2013.01); *B29C 45/27* (2013.01); *B29C 2049/4807* (2013.01)

(58) Field of Classification Search
CPC ... B29C 33/301; B29C 33/306; B29C 33/308; B29C 45/376; B29C 2049/4858; B29C 2037/80

USPC ............... 249/102, 103, 53 R; 425/171, 173
See application file for complete search history.

(56) References Cited

U.S. PATENT DOCUMENTS

| 880,575 | A | * | 3/1908 | Rowley | ............... B29C 33/0038 249/155 |
| RE14,371 | E | * | 10/1917 | Dietrich | ..................... 249/53 R |
| 3,103,705 | A | * | 9/1963 | Iiija | ........................ B22D 17/22 164/342 |
| 4,637,789 | A | * | 1/1987 | Netznik | ................ B29C 33/308 249/112 |
| 5,743,510 | A | * | 4/1998 | Johnston | ............... B28B 7/0014 249/155 |

(Continued)

*Primary Examiner* — Robert B Davis

(57) ABSTRACT

Molding assemblies and molding processes are disclosed. The molding assemblies are for producing a product and include a first subassembly and a second subassembly for the producing of the product. The first subassembly includes a cavity insert arrangement corresponding with the design of the product, a movable insert abutting the cavity insert arrangement, and rail members securing the movable insert with interlocking features at a specific location, the specific location being one of multiple movable insert positions. The molding process includes molding a first product with the movable insert and the additional movable insert being positioned at a first movable insert portion, removing the subassembly from the second subassembly, re-positioning the movable insert and the additional movable insert to a second movable insert position, and molding a second product with the movable insert and the additional movable insert being positioned at the second movable insert portion.

12 Claims, 2 Drawing Sheets

(56) References Cited

U.S. PATENT DOCUMENTS

| | | | | |
|---|---|---|---|---|
| 5,962,037 A | * | 10/1999 | Kao | B29C 45/26 |
| | | | | 425/190 |
| 6,896,505 B2 | * | 5/2005 | Towery | B29C 45/2673 |
| | | | | 425/185 |
| 7,204,685 B1 | * | 4/2007 | Crain | B29C 45/2673 |
| | | | | 425/185 |
| 7,338,626 B1 | * | 3/2008 | Groth | B29C 45/2673 |
| | | | | 264/297.2 |

\* cited by examiner

MOLDING ASSEMBLY AND MOLDING PROCESS

FIELD OF THE INVENTION

The present invention is directed to manufacturing processes and manufactured products. More particularly, the present invention is directed to molding assemblies and molding processes.

BACKGROUND OF THE INVENTION

Known assemblies for injection molding include specific molds, which can be expensive for producing products. Other known assemblies for injection molding include modular spacers that allow limited modification of product designs using a single mold, but they can also be expensive. In addition, the spacers can increase production costs by requiring additional material and requiring additional assembly.

Use of spacers in molding assemblies for limited modification of product designs can also be problematic due to the introduction of errors corresponding with modularity of the spacers. For example, there is an ongoing desire to make spacers capable of supporting numerous changes to permit a greater number of product designs to be produced from a single mold. However, the use of numerous spacers permits the introduction of error due to such flexibility and due to the ability to improperly insert spacers without clear directions being present.

Molding assemblies and molding processes that show one or more improvements in comparison to the prior art would be desirable in the art.

BRIEF DESCRIPTION OF THE INVENTION

In an embodiment, a molding assembly for producing a product includes a first subassembly and a second subassembly corresponding with the first subassembly for the producing of the product. The first subassembly includes a cavity insert arrangement corresponding with the design of the product, a movable insert abutting the cavity insert arrangement, and rail members securing the movable insert with interlocking features at a specific location, the specific location being one of multiple movable insert positions.

In another embodiment, a molding assembly includes a first subassembly having a cavity insert arrangement, a movable insert, and a rail configuration. The molding assembly also includes a second subassembly having an additional cavity insert arrangement, an additional movable insert, and an additional rail configuration. The first subassembly is releasably positioned on the second subassembly. The first subassembly and the second subassembly are configured for repeated molding with the movable insert and the additional movable insert being positioned at a first movable insert position and re-positioned at a second movable insert position.

In another embodiment, a molding process includes providing a first subassembly having a cavity insert arrangement, a movable insert, and a rail configuration, providing a second subassembly having an additional insert arrangement, an additional movable insert, and an additional rail configuration, releasably positioning the first subassembly on the second subassembly, molding a first product with the movable insert and the additional movable insert being positioned at a first movable insert portion, removing the first subassembly from the second subassembly, re-positioning the movable insert and the additional movable insert to a second movable insert position, and molding a second product with the movable insert and the additional movable insert being positioned at the second movable insert portion, the first product having a different design than the second product.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are molding assemblies and processes of molding. Embodiments of the present disclosure, for example, in comparison to concepts failing to include one or more of the features disclosed herein, permit lower production costs, permit lower material costs, permit lighter weight molding assemblies to be used, reduce or eliminate use of modular spacers, reduce production error (for example, by including indicia for specific configurations), permit a greater number of designs to be produced from one molding assembly, permit other suitable advantages and distinctions that will be apparent from the present disclosure, or permit a combination thereof.

Figure 1:
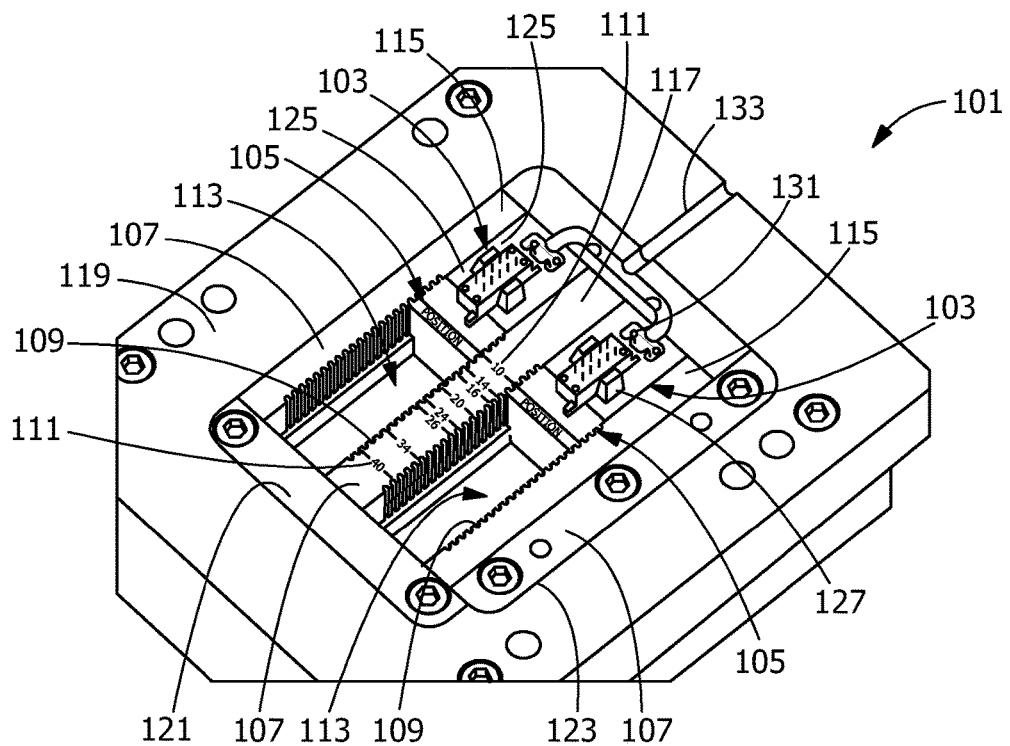
FIG. 1 is a perspective view of an embodiment of a molding subassembly, according to the disclosure.
Figure 2:
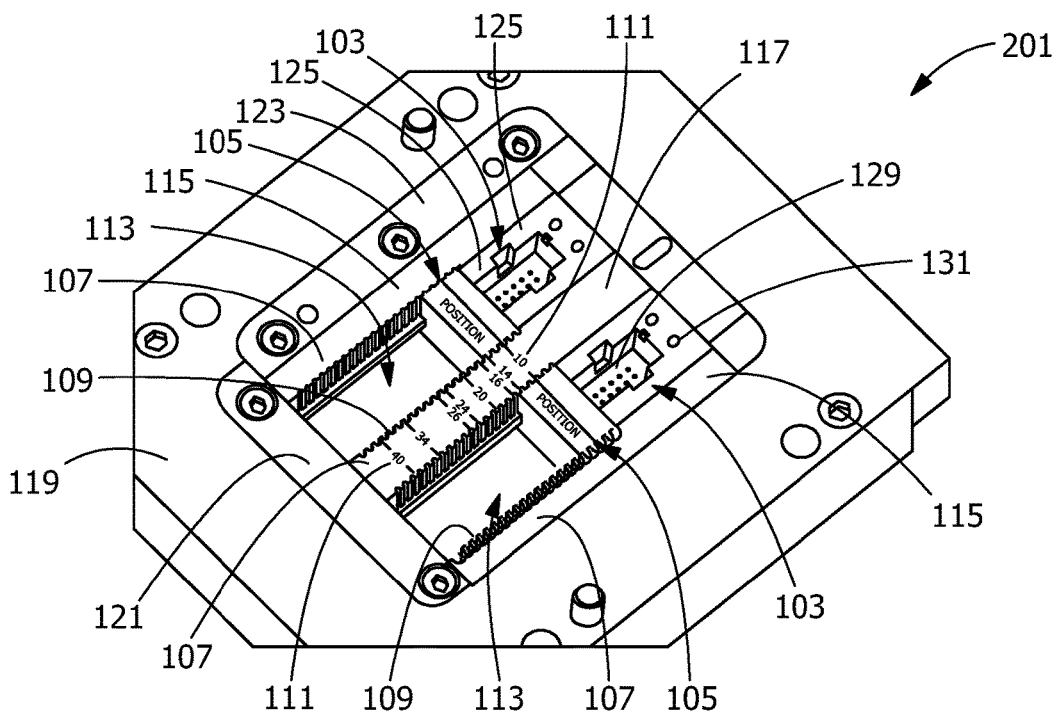
FIG. 2 is a perspective view of an embodiment of an additional molding subassembly corresponding with the molding assembly of FIG. 1, according to the disclosure.
Figure 3:
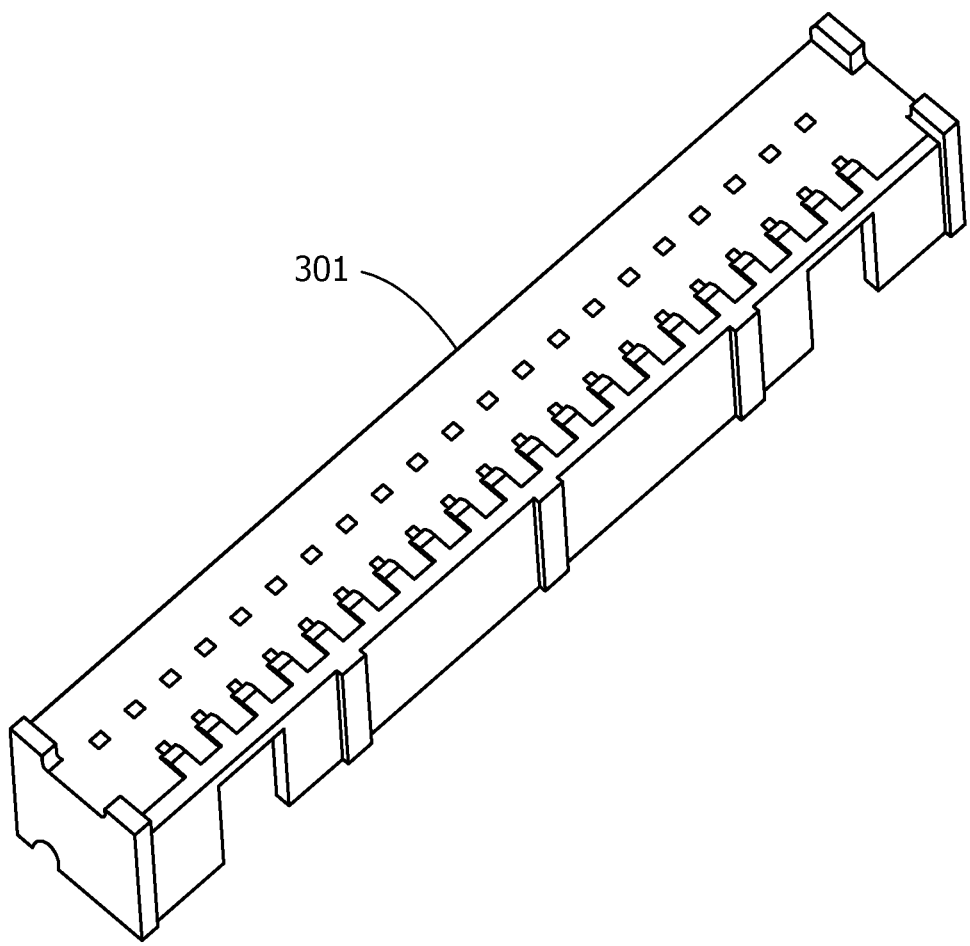
FIG. 3 is a perspective view of a product produced by using the molding subassembly of FIG. 1 and the additional molding subassembly of FIG. 2 according to an embodiment of a molding process, according to the disclosure.

Referring to FIGS. 1-2, a molding assembly is used for producing a product 301, for example, as is shown in FIG. 3. As will be appreciated by those skilled in the art, the product 301 is capable of having limitless design and geometric features and is not limited to the design of the product 301 shown in FIG. 3. The molding assembly is for injection-molding, blow-molding, compression-molding, or any other suitable molding technique.

The molding assembly includes a first subassembly 101, an embodiment of which is shown in FIG. 1, and an additional or second subassembly 201, an embodiment of which is shown in FIG. 2. The first subassembly 101 and the second subassembly 201, when releasably mated together, correspond or align to form the mold assembly for which the product 301 is produced through molding. In one embodiment, the first subassembly 101 and/or the second subassembly 201 include(s) one or more cavity insert arrangement(s) 103 corresponding with the design of the product 301, one or more movable insert(s) 105 abutting the cavity insert arrangement 103, and one or more rail members 107 with interlocking features 109 to secure the movable insert 105 in the first subassembly 101 or second subassembly 201.

The movable insert 105 is one or more inserts and is positionable at one or more specific locations within the first subassembly 101 and/or the second subassembly 201. For example, the movable insert 105 is positionable at a specific location along the rail member(s) 107, the specific location being one of multiple movable insert positions. In one embodiment, the specific location is selected from a position identifiable, for example, with labels or indicators 111 (for example, characters, such as numerals, pictures, and/or letters) corresponding with positions on the interlocking features 109. The indicators 111 permit repeatable alignment of the movable insert 105 at the multiple movable insert positions. This facilitates mold setup, as personnel can easily and quickly identify which multi-position part is needed and where the movable insert 105 is to be inserted, allowing easy verification that the movable insert is correctly positioned in the respective subassembly.

Upon the movable insert 105 being secured by the interlocking features 109 within the first subassembly 101 or the second subassembly 201, the movable insert 105 and the rail member(s) 107 define an open region 113 within the molding first subassembly 101 or the second subassembly 201. The open region 113 is devoid of spacers, which can be used in comparative assemblies for molding and can result in additional costs and weight for such assemblies. In some embodiments a plurality of the open regions 113 are present, for example, based upon designs for making a plurality of the products 301.

The interlocking features 109 are, for example, tongue-and-groove arrangements which are provided on both the rail members 107 and the ends of the movable inserts 105. The interlocking features 109 align and interlock to provide the movable insert 105 with stability in a plurality of directions in response to force from a plurality of directions. In one embodiment, the interlocking features 109 have a pitch spacing (the distance between protruding portions or the distance between receding portions) that is equal to a desired spacing of a feature on the product 301 to be produced by the molding assembly.

The rail members 107 include side rail members 115 and/or interior rail members 117. In an illustrative embodiment, each of the side rail members 115 and/or interior rail members 117 is in contact with a housing 119 of the first subassembly 101 and/or the second subassembly 201. In an illustrative embodiment, each of the side rail members 115 and/or the interior rail members 117 is in contact with an axial wedge member 121 configured for providing axial force to reduce or eliminate axial movement of elements within the first subassembly 101 and/or the second subassembly 201. In an illustrative embodiment, each of the side rail members 115 and/or the interior rail members 117 is in contact with a transverse wedge member 123 configured for providing transverse force to reduce or eliminate transverse movement of elements within the first subassembly 101 and/or the second subassembly 201. As used herein the term "axial" refers to a direction parallel or substantially parallel with the length of the longer portion of one or more of the rail members 107 and the term "transverse" refers to a direction perpendicular or substantially perpendicular to the length of the longer portion of one or more of the rail members 107.

The cavity insert arrangement 103 includes one or more cavity inserts 125 that define the design of the product 301 produced by the molding assembly. For example, the cavity inserts 125 positioned within the first subassembly 101 correspond with the cavity inserts 125 of the second subassembly 201 such that, upon positioning the first subassembly 101 and the second subassembly 201 together, the molding material (not shown) is capable of flowing into the cavity inserts 125. In further embodiments, each of the first subassembly 101 and/or the second subassembly 201 include a plurality of the cavity insert arrangements 103 (and thus a plurality of the cavity inserts 125), thereby permitting production of a plurality of the products 301.

In one embodiment, the cavity insert arrangement 103 includes producing protrusions 127 (as shown in FIG. 1) and/or recessed portions 129 (as is shown in FIG. 2) corresponding with the design of the product(s) 301. The protrusions 127 and/or the recessed portions 129 are defined by one of the cavity inserts 125 or are defined by a plurality of the cavity inserts 125. All of the cavity inserts 125 are configured for receiving or directing the flow of the molding material (not shown) as it enters the cavity insert arrangement 103.

In one embodiment, the flow of the molding material (not shown) enters the cavity insert arrangement 103 from a gate insert 131. The gate insert 131 abuts the cavity insert arrangement 103 opposite the movable insert 105. The gate insert 131 is arranged and disposed to receive the molding material from outside of the molding assembly, for example, through a flow-path 133, such as, a channel that is within one or both of the first subassembly 101 and the second subassembly 201.

Through the molding assembly including the first subassembly 101 and the second subassembly 201, a molding process that reduces or eliminates drawbacks of the prior art is capable of being performed. For example, the first subassembly 101 and the second subassembly 201 permit repeated molding with the movable insert(s) 105 being capable of being positioned at a first movable insert position and re-positioned at a second movable insert position. Additionally or alternatively, the first subassembly 101 and the second subassembly 201 permit releasable positioning of the first subassembly 101 and the second subassembly 201, for example, for repeated production of the product(s) 301 by removing the first subassembly 101 and the second subassembly 201 upon molding of the product(s) 301.

The movable insert 105 of the present invention accommodates the molding of multiple parts, thereby eliminating the necessity of multiple tooling inserts. The use of indicators allows for easy setup and easy verification that the movable insert is correctly positioned in the respective subassembly. The interlocking feature provides the movable insert 105 with stability in a plurality of directions.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A molding assembly for producing a product, the molding assembly comprising:
   a first subassembly and a second subassembly corresponding with the first subassembly for the producing of the product, the first subassembly comprising:
   a cavity insert arrangement corresponding with the design of the product;

a movable insert abutting the cavity insert arrangement; and rail members securing the movable insert with interlocking features at a specific location, the specific location being one of multiple movable insert positions, wherein the rail members include two side rail members and an interior rail member, one of the two side rail members and the interior rail member securing the movable insert.

2. The molding assembly of claim 1, wherein the product is an injection-molded product.

3. The molding assembly of claim 1, wherein the product is a blow-molded product.

4. The molding assembly of claim 1, wherein the product is a compression-molded product.

5. A molding assembly for producing a product, the molding assembly comprising:
   a first subassembly and a second subassembly corresponding with the first subassembly for the producing of the product, the first subassembly comprising:
      a cavity insert arrangement corresponding with the design of the product;
      a movable insert abutting the cavity insert arrangement;
      rail members securing the movable insert with interlocking features at a specific location, the specific location being one of multiple movable insert positions; and
   a transverse wedge member arranged and disposed to apply transverse force to the rail members, thereby applying force to the cavity insert arrangement and the movable insert.

6. A molding assembly for producing a product, the molding assembly comprising:
   a first subassembly and a second subassembly corresponding with the first subassembly for the producing of the product, the first subassembly comprising:
      a cavity insert arrangement corresponding with the design of the product;
      a movable insert abutting the cavity insert arrangement; and
      rail members securing the movable insert with interlocking features at a specific location, the specific location being one of multiple movable insert positions;
   wherein the movable insert being secured in the specific location and the rail members define an open region within the molding assembly.

7. The molding assembly of claim 1, wherein the rail members include indicators corresponding with positions on the interlocking features, the indicators permitting repeatable alignment of the movable insert at the multiple movable insert positions.

8. The molding assembly of claim 7, wherein the indicators are numerals correlated with the number of the interlocking features.

9. The molding assembly of claim 1, wherein the cavity insert arrangement includes a plurality of cavity inserts.

10. A molding assembly for producing a product, the molding assembly comprising:
    a first subassembly and a second subassembly corresponding with the first subassembly for the producing of the product, the first subassembly comprising:
       a cavity insert arrangement corresponding with the design of the product;
       a movable insert abutting the cavity insert arrangement; and
       rail members securing the movable insert with interlocking features at a specific location, the specific location being one of multiple movable insert positions; and
    the second subassembly comprising:
       an additional cavity insert arrangement corresponding with the design of the product;
       an additional movable insert abutting the additional cavity insert arrangement; and
       additional rail members securing the additional movable insert with an additional set of the interlocking features,
    wherein the additional rail members include two side rail members and an interior rail member, one of the two side rail members and the interior rail member securing the additional movable insert.

11. The molding assembly of claim 10, further comprising a second additional cavity insert arrangement and a second additional movable insert, the second additional cavity insert arrangement and the additional second movable insert being arranged and disposed to produce an additional product concurrently with the product.

12. A molding assembly for producing a product, the molding assembly comprising:
    a cavity insert arrangement corresponding with the design of the product;
    a movable insert abutting the cavity insert arrangement; and
    rail members securing the movable insert with interlocking features at a specific location, the specific location being one of multiple movable insert positions; and
    the second subassembly comprising:
       an additional cavity insert arrangement corresponding with the design of the product;
       an additional movable insert abutting the additional cavity insert arrangement; and
       additional rail members securing the additional movable insert with an additional set of the interlocking features,
    wherein the additional movable insert is secured in and partially defines an open region within the molding assembly.

* * * * *